United States Patent [19]

Bogaerts et al.

[11] Patent Number: 5,597,259
[45] Date of Patent: Jan. 28, 1997

[54] PLATE ASSEMBLY

[75] Inventors: Constant Bogaerts, Schilde; Eric Van Echelpoel, Lier; Henri Goossen; Luc Van Goethem, both of Wilrijk; Luc Van Aken, Kuringen, all of Belgium

[73] Assignee: AGFA-Gevaert N. V., Mortsel, Belgium

[21] Appl. No.: 265,764

[22] Filed: Jun. 27, 1994

[30] Foreign Application Priority Data

Jul. 12, 1993 [EP] European Pat. Off. ............. 93202054

[51] Int. Cl.⁶ ................................ F16B 5/00; H05K 5/02; H05K 7/18
[52] U.S. Cl. ............... 403/263; 403/14; 403/244; 29/466; 29/464; 211/26; 248/223.41; 361/802; 361/796; 361/752
[58] Field of Search ............... 83/694, 686; 29/464, 29/466; 174/35 R, 35 MS; 361/752, 756, 796, 797, 802, 816, 818; 248/224.4, 223.4, 150; 211/26, 41; 403/13, 14, 263, 244, 242, 231, 364

[56] References Cited

U.S. PATENT DOCUMENTS

| 3,818,280 | 6/1974 | Smith et al. ............... 361/802 X |
| 3,851,222 | 11/1974 | Michalak et al. . |
| 4,452,359 | 6/1984 | Koppensteiner ............... 211/41 |
| 4,945,633 | 8/1990 | Hakanen et al. ............... 361/752 X |

FOREIGN PATENT DOCUMENTS

| 1096968 | 6/1955 | France ............... 361/796 |
| 2-237097 | 9/1990 | Japan ............... 361/802 |
| 3-276697 | 12/1991 | Japan ............... 361/802 |
| 1202926 | 8/1970 | United Kingdom ............... 29/464 |

*Primary Examiner*—Anthony Knight
*Attorney, Agent, or Firm*—William J. Daniel

[57] ABSTRACT

The present invention provides an assembly of a first panel formed with at least one insertion notch extending inwardly from at least one panel edge and a second panel carrying at least one projecting tab extending outwardly of at least one of its edge and fitting in one of the notches. The tab has on at least one of its sides a shoulder defining an edge which is located along the projecting length of the tab at a position intermediate the free edge of the tab and its base, which usually coincides with the edge of the panel from which it projects. The shoulder edge is in abutting contact with a region of the first panel adjacent the insertion notch in the first panel in which the tab fits and functions to maintain the associated edge of the second panel out of contact with the first panel so that the relative positions of the panels is determined by such abutting contact and is independent of other factors, such as the precise linearity of the panel edge. Multiple tabs can be provided on the same panel and in the same plane for insertion into corresponding notches.

8 Claims, 7 Drawing Sheets

5,597,259

PLATE ASSEMBLY

FIELD OF THE INVENTION

This invention relates to a panel assembly, which is particularly suitable for application in certain kinds of apparatus.

BACKGROUND OF THE INVENTION

Most kinds of apparatus, such as e.g. a photographic camera, a processor for exposed materials, an optoelectronic scanner, a xerographic copier, or a thermal printer, are mounted within a generally rectangular housing, which may include a rectangular metal frame for supporting various parts of the apparatus.

In many of these apparatus, the metal frame is made up at least in part from panels and the mechanical geometry of the frame panels, especially the relative distance between them, is very important in order to guarantee that the apparatus be of good quality and operate reliably.

The frame of the apparatus thus has to be designed and manufactured to satisfy rather small and demanding tolerances, thereby minimizing the creation of disturbing gaps or separations between panels. In addition, the frame thus formed needs a geometry which requires no adjustment after assembly and which remains stable over time.

OBJECT OF THE INVENTION

Accordingly, it is an object of the present invention to provide an improved assembly of a first panel with another panel in a well defined geometrical relationship such that the distance between said panels is correct in at least one direction, without the need to resort to supplementary positioning means or to complicated machining.

These and other objects of the invention will become apparent from the following description.

SUMMARY OF THE INVENTION

We now have found that the above objects can be achieved by providing an assembly of a first panel having at least one insertion notch therein extending inwardly of at least one edge thereof, and a second panel includes a body portion which is provided with at least one projecting tab extending outwardly from one edge thereof and fitting in the insertion notch wherein the tab has at least one shoulder located at a point along the projecting length of the tab which is intermediate a top or free end of the tab and a base or bottom of the tab adjacent the one edge of the panel, and wherein such shoulder is in abutting contact with the first panel, with the one edge of the second panel being held spaced away from and out of contact with the first panel.

Further embodiments of the present invention are set forth in the detailed description given hereinbelow.

BRIEF DESCRIPTION OF THE DRAWINGS

The invention will be described with reference to the accompanying drawings without limiting the invention thereto, in which.

DETAILED DESCRIPTION OF THE INVENTION

Figure 1:
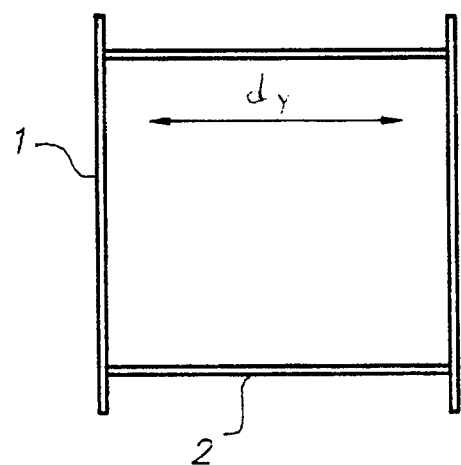
FIG. 1 is a schematic view of an apparatus with a frame comprised of panels.

Reference is first made to FIG. 1, in which there is illustrated a schematic side view of an apparatus with a frame comprising panels 1 and 2 which may suitably be steel plates or the like.

Figure 2:
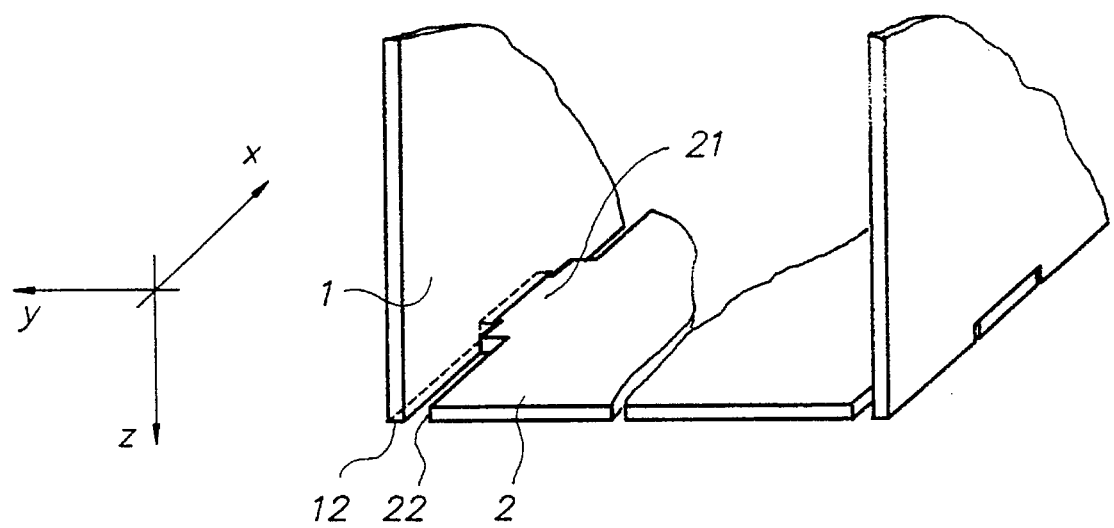
FIG. 2 is a fragmentary perspective view of one panel assembly according to the present invention wherein tab-carrying panels are arranged perpendicular to a panel provided with insertion notches.

One possible arrangement for such panels is illustrated in a fragmentary perspective view in FIG. 2. In FIG. 2, there is indicated a rectangular coordinate system having a X, a Y and a Z axis in conjunction with an assembly in which, for purposes of illustration, a first panel 1 is held in spaced apart vertical relation to another (optional) similar panel (not identified by number) by a second panel 2 intervening between them. The first panel 1 has an outwardly opening insertion opening or notch slot 11 (see FIG. 3) therein and the similar panel is similarly constructed. The second panel 2 has a projecting tongue or tab 21 extending outwardly from each of two opposite edges thereof, one of which is designated 22, the tabs lying in the same plane as the body of panel 2.

Figure 3:
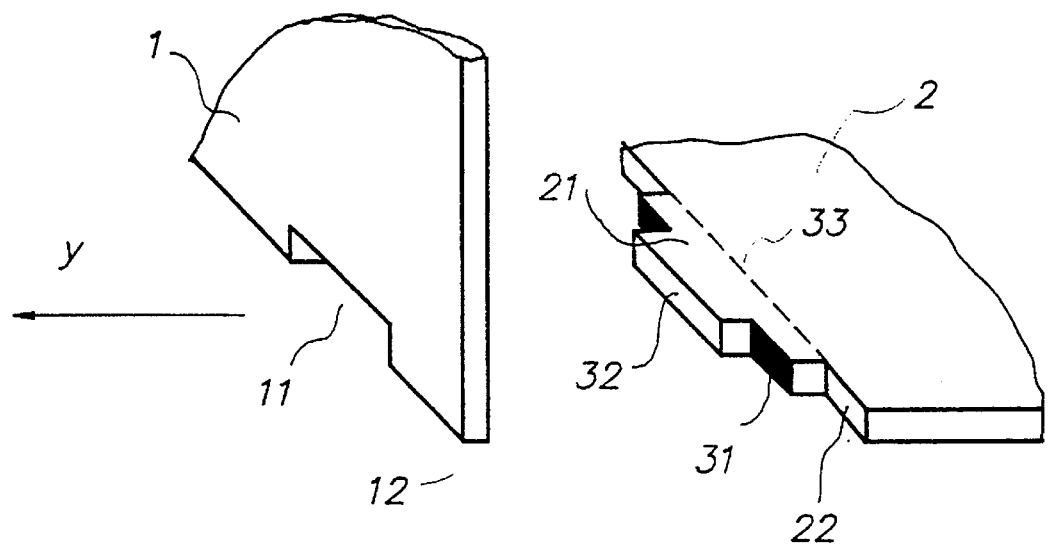
FIGS. 3 shows a detail exploded view of a portion of the assembly of FIG. 2.

Referring more particularly to FIG. 3, panel 1 is provided with at least one insertion notch 11 and panel 2 is provided with at least one projecting tab 21 extending outwardly from one edge 22 thereof, which is adapted to fit in notch 11. As indicated by shading in FIG. 3 for emphasis, projecting tab 21 has at least one shoulder edge 31, of which two are shown on opposite sides of the tab, located between its free end or extremity 32 and its base 33 which generally coincides with the edge of the panel from which the tab projects and is indicated in broken lines. When the panels are fitted together with the tab 32 inserted into notch 11, a portion of panel 1 laterally to at least one side of insertion notch 11, in this case on both such sides, makes abutting contact with shoulder edge 31 of panel 2, and as a consequence of such abutting contact, edge 22 of second panel 2 is held out of contact with first panel 1.

Figure 6:
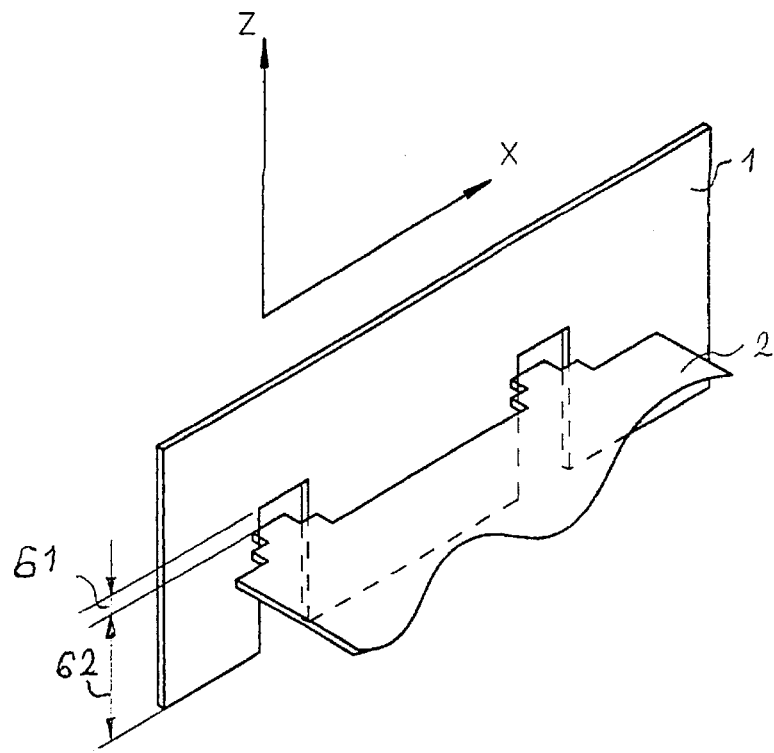
FIG. 6 is a modification of the assembly of FIG. 6 wherein the second panel is located in a plane spaced inwardly of the edge of the second panel in which the insertion notches are provided.

In order to facilitate the introduction of tab 21 into slot 11, the end edge 32 of said tab 21 may be chamfered or tapered (not shown). Generally, the projecting length of a tab is defined by the distance between its free end or extremity and its base, which usually coincides with the edge of the panel 2 from which the tab extends. If the notched panel 2 lies in a plane perpendicular to the tab-carrying panel, the projecting length of the tab may be slightly greater than the thickness of the notched panel, so that the tab may project very slightly beyond the outer face of the notched panel, as illustrated in FIGS. 4 and 6.

In order to attain a precise position of panel 2 with respect to panel 1 in the direction of the Y axis, i.e. normal to the surface of shoulder 31, in most of the prior art, the machining tolerances of the panels are rather tight. It is a surprising advantage of the present invention, that even with rather broad tolerances of the individual panels 1, 2, a high final accuracy of the total frame may still be achieved. Indeed, it is only required for panel 2 that each shoulder 31 (intentionally shadowed in FIGS. 3 and 5) should be shaped, i.e. by punching, with sufficient accuracy. The remaining faces which have no abutment nor positioning function (as e.g. the top edge 32 of the tab) may be made with only a normal precision as it results from usual punching tolerances. For panel 1, it is required that the "X-length" (representing the dimension in a direction according to the X axis) of insertion notch 11 and the "Z-width" (representing the dimension in a direction according to the Z axis) of that opening 11 be not smaller than the respective X-length and Z-width of the corresponding tab 21 (see clearances 41 in the X-direction indicated in FIGS. 4 and 7, and clearances 61 in the Z direction as indicated in FIG. 6).

Figure 4:
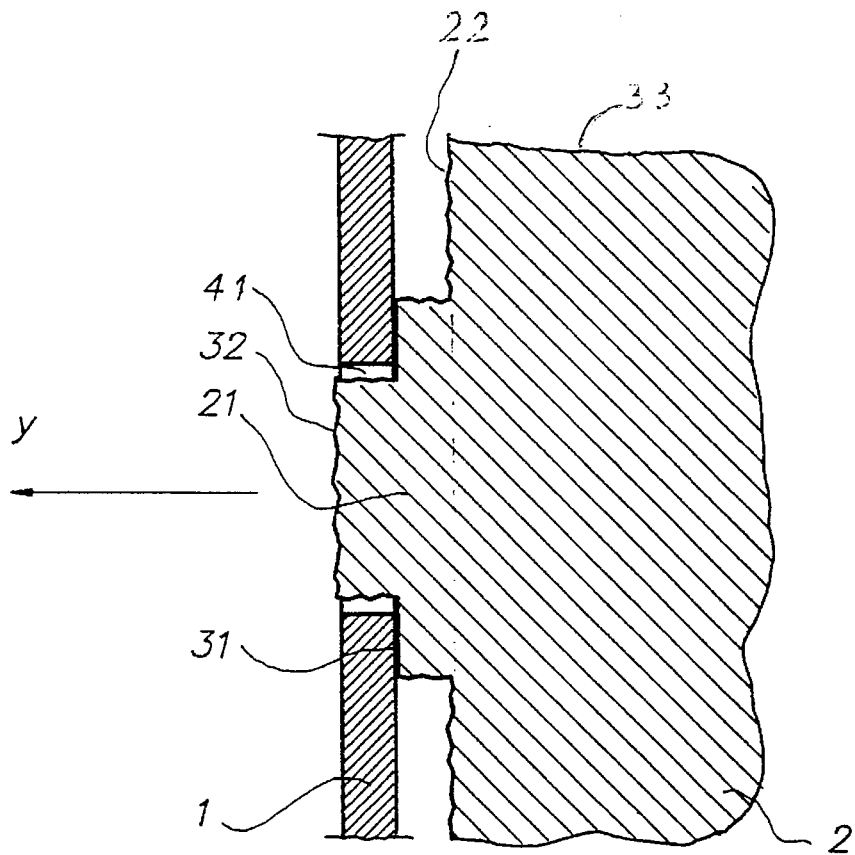
FIG. 4 is an enlarged detail view in section of the assembly of FIG. 3 in assembled condition.

It will be clear from FIG. 4 in particular that the present invention provides a simple construction which enables two panels to be assembled in predictable position, despite variations in the thicknesses of the respective panels and despite possible deviations in the rectilinearity of the edge of the notched panel.

In the case of a perpendicular engagement between panels 1 and 2 (as already illustrated in FIGS. 1, 2 and 3), the prior state of the art usually provides an angled portion or a flange (not shown) bent up at the Y-directed edge 22 of panel 2. This flange then generally makes an abutting contact with its angular leg with panel 1, when fastened by e.g. a bolt connection. The prior art bending of panel 2 in order to make such a flange inherently introduces bending tolerances, which are standardized in e.g. the German DIN 6930. The present invention does not use any bending for abutting panels 1 and 2, but mainly uses a punching or cutting operation with inherent punching tolerances. Generally, these punching tolerances are about two times smaller than corresponding bending tolerances (for the same materials, thicknesses and lengths). This can be confirmed by reference to DIN 6930, especially part II.

It follows from the above that the assembly according to the present invention has much better positioning tolerances than the prior art. Hence, the relationship of the assembled panels 1 and 2 is correct in at least the Y-direction, and this without the need for supplementary positioning means, or of complicated machining. Where it is possible to reduce to nearly zero the clearances between the ends of the notches and the tab lateral edges in the X-direction, e.g. as at 41 in FIG. 4, panels 1 and 2 would also be positioned in the assembly correctly in the X-direction also.

In a preferred embodiment of the present invention (see FIG. 3), the projecting tab has two shoulder edges, formed by corresponding tab portions, one at each lateral side of the tab.

Figure 5:
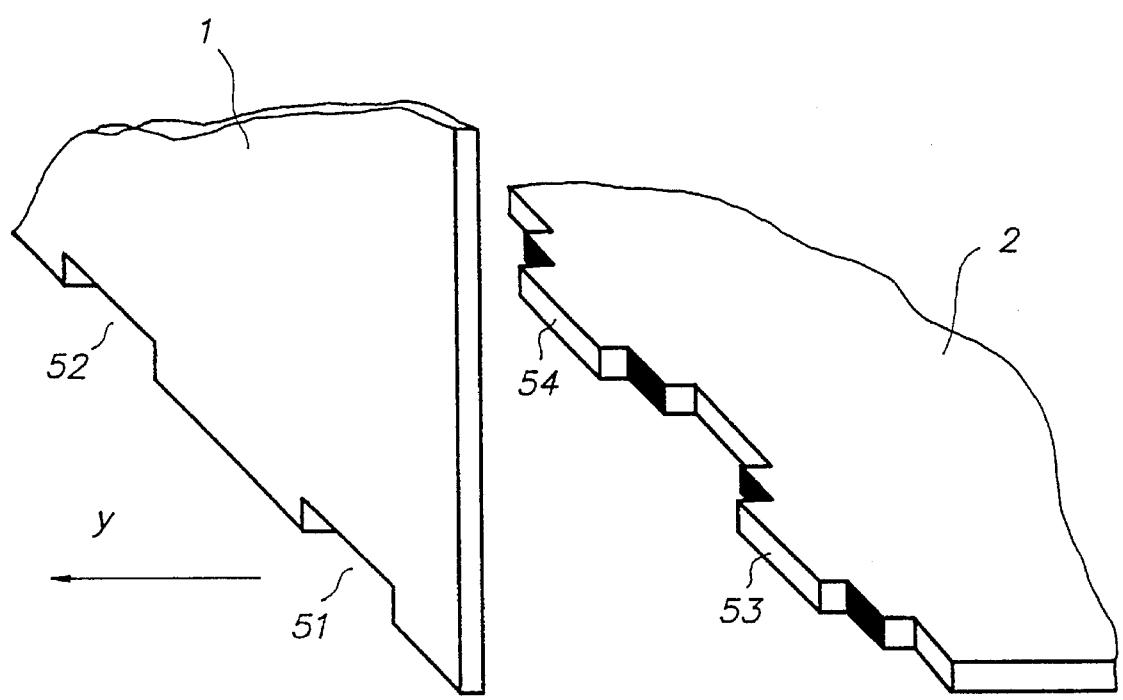
FIG. 5 is an exploded perspective of another assembly according to the invention having on one panel two projecting tabs in the same plane and on the other panel corresponding insertion notches.

It should be clear that in practice a given panel 2 may have more than one tab 21. Especially if the panels 1 and 2 are rather large in size, it is often advantageous, in order to align both panels precisely over their total length, to provide several sets of cooperating tabs and slots. FIG. 5 illustrates a case where two tabs 53 and 54 are used on the second panel, lying substantially in a same plane of a second panel, with a first panel 1 which accordingly comprises two corresponding insertion notches 41 and 42.

From the foregoing explanation, it will be clear that the concept of the present invention may be applied not only to the edges of a frame but also with some modification at interior positions, spaced some distance from an edge inside of panel 1. FIG. 6 shows an embodiment where the panel 1 is situated some distance, i.e. in the Z-direction, as indicated by 62, from the actual edge of the notched panel 2. This is achieved as the drawing shows by extending the depth of the notch or notches into the body of panel 2.

In a preferred embodiment of the present invention, the cross sectional shape of a tab corresponds generally with the shape of the corresponding insertion notch. Generally, the two cross-sections may have a corresponding rectangular shape which guarantees a correct positioning accuracy.

While the use of a fastening means is not required to practice the invention, the assembly further may comprise at least one fastening means (not shown in the drawings) for securing said panels 1, 2 to each other and to preclude relative movement of the plate members. Indeed, even if the projecting tabs 21 engage tightly into the insertion openings 11, both panels 1,2 have to be held in correct and fixed operative engagement.

Figure 7:
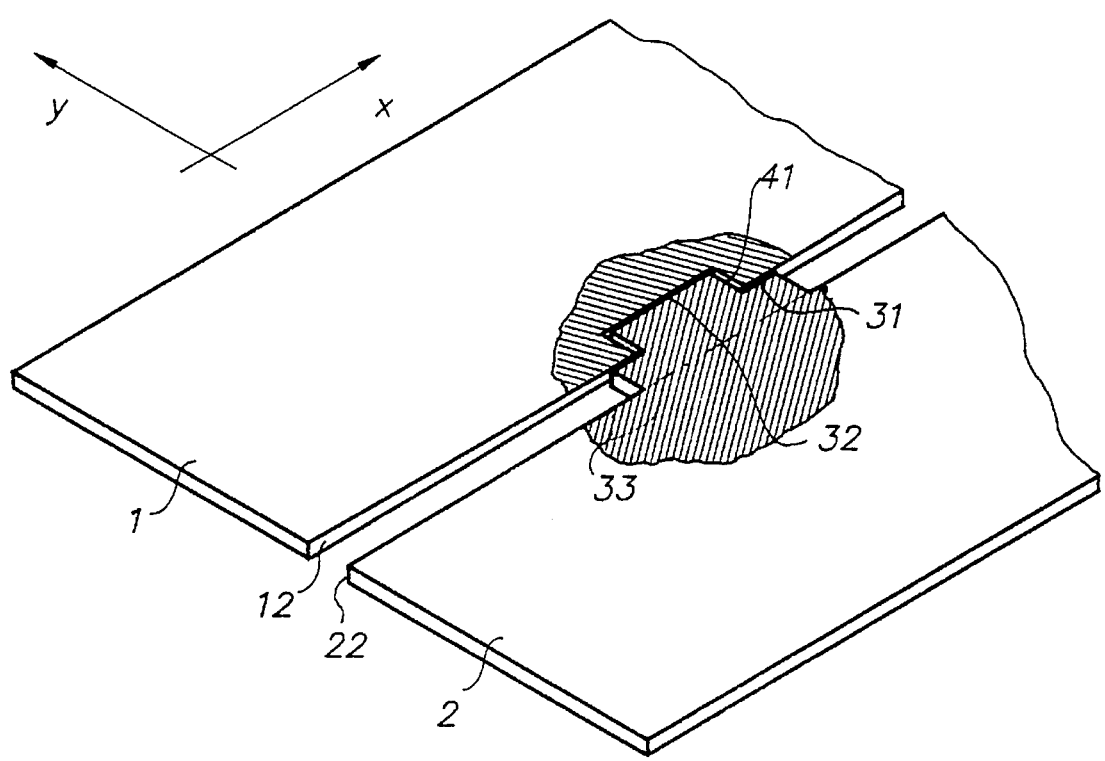
FIG. 7 is a perspective view illustrating another assembly according to the invention where the panels are arranged in coplanar relation.

An alternative of the present invention relates to an assembly of two adjacent panels 1 and 2, wherein second panel 2 is in a plane parallel to the plane of said first panel 1. FIG. 7 shows a preferred embodiment of an assembly of two adjacent panels in a same plane with an edge to edge contiguous relationship and substantially planar engagement according to the present invention. As the designated elements of FIG. 7 are similar in structure and operation to those of the correspondingly numbered structural elements described in relation to FIGS. 1 to 6, no further description of the FIG. 7 embodiment is required.

Figure 8:
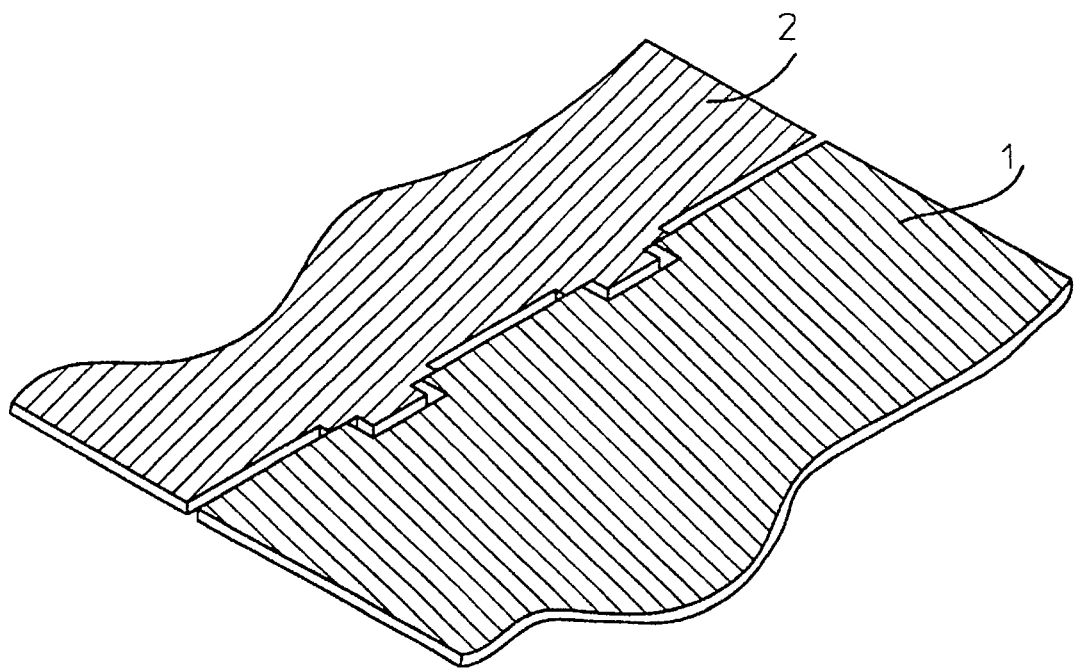
FIG. 8 is a perspective of a modification of the assembly of FIG. 7 having on one panel two tabs in the same plane and on the other panel corresponding notches.

FIG. 8 illustrates a further embodiment of an assembly with a planar engagement comprising two projecting tabs and corresponding openings in a common plane. Such an embodiment, wherein the second panel 2 is in a plane coinciding with the plane of the first panel 1, could occasionally also be applied in jointly mounting at least a first unit (e.g. a feeder mechanism for introducing blank paper sheets) and a second unit (e.g. a xerographic copying unit) on the same footplate as a common support in the overall apparatus.

Figure 9A:
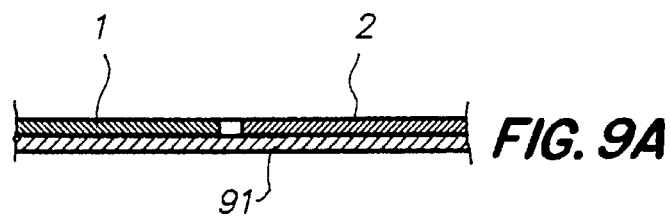
FIG. 9A and 9B are front elevation and top plan views respectively of a further modification of the assembly of FIG. 8 wherein the two coplanar panels rest on a common footplate.
Figure 9B:
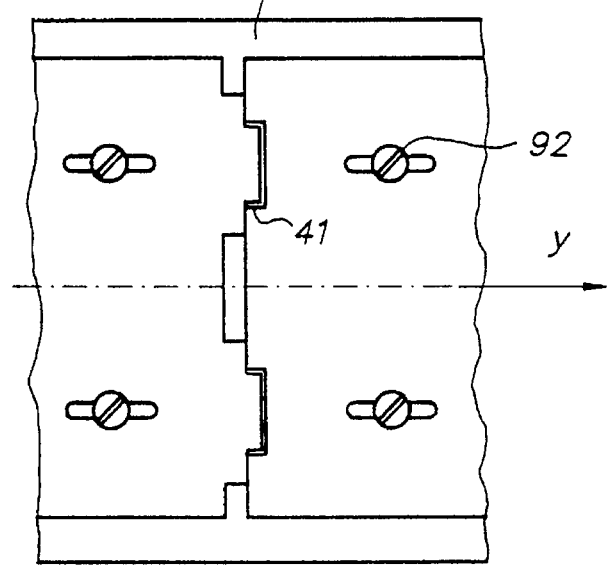
Figure 10:
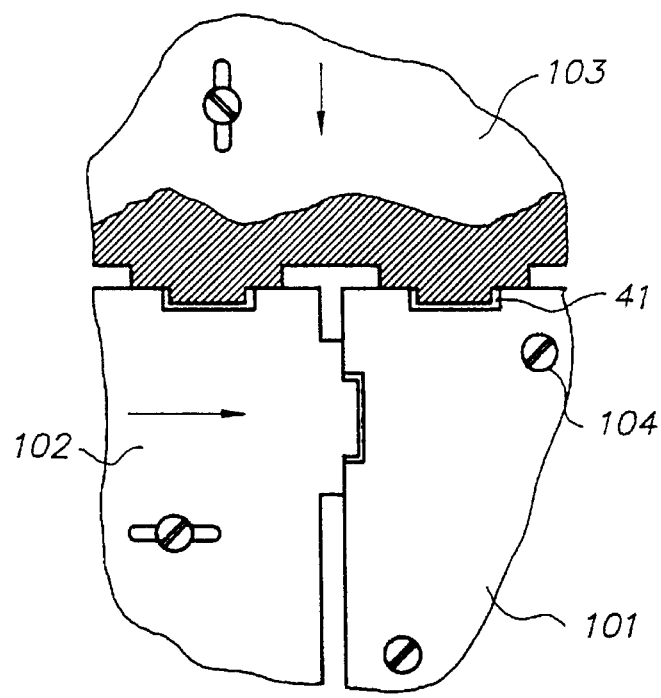
FIG. 10 is a fragmentary top plan view of another modification of the assembly of FIG. 8 having three coplanar panels arranged with one panel having two projecting tabs engaged in insertion notches provided in two adjacent panels.

In FIG. 9, use is made of two panels 1 and 2 on a common footplate 91 and secured by fixing means 92. In FIG. 10, use is made of three panels 101, 102 and 103 on a common footplate (not visible in the drawing) and secured by fixing means 104. In FIG. 10, panel 101 is indicated as being fixed (by means 104) and panels 102 and 103 abut with their respective shoulders with an edge to edge contiguous and substantially planar engagement.

Recalling the objects of the invention, it is very important to understand the fact that the geometrical precision of the assembly is essentially achieved by punching techniques (cf. shoulder edge 31 on projecting tab 21). In addition, neither the base line 33 of the tab or edge 22 of panel 2 essentially does not contact panel 1 and hence does not affect the positional precision of the panels.

From the foregoing teachings, it will be clear that the individual panels 1, 2, 91, 101, 102, 103 are not restricted to strict vertical nor strict horizontal positions.

Figure 11:
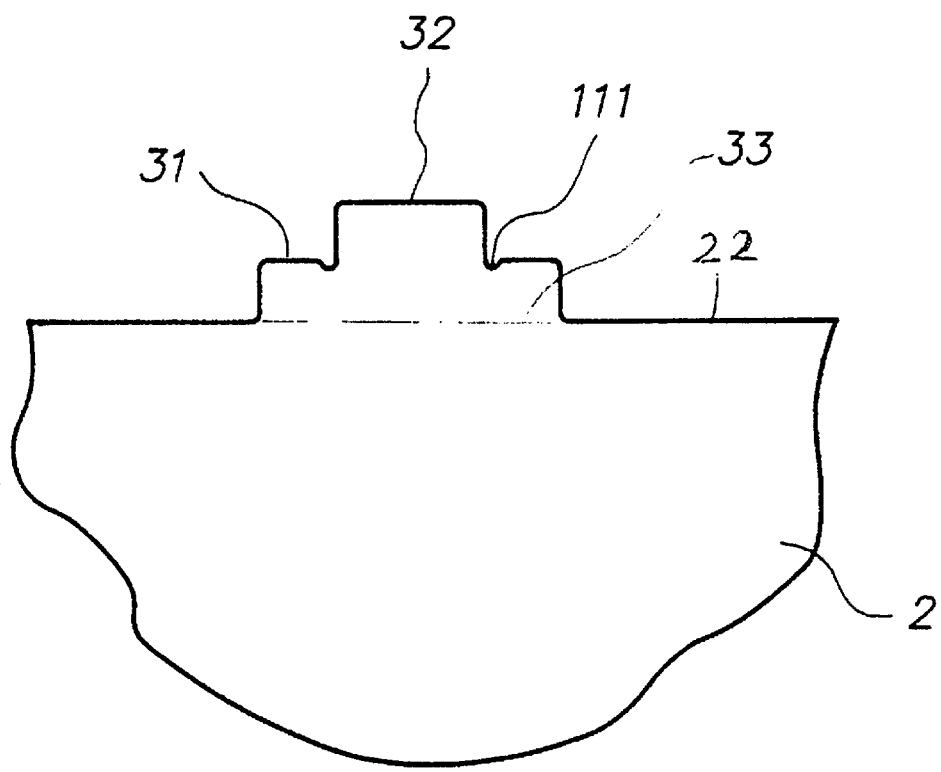
FIG. 11 is a fragmentary top plan view of a different configuration for the tab-carrying panel wherein shallow grooves are formed at the inboard ends of the shoulders of the tab.

FIG. 11 shows a partial plan view of a modified configuration for second panel 2. It is noted that panel 2 may have an undercut or groove 111 in each shoulder 31 directly adjacent the lateral limit thereof to facilitate the manufacture of a precise shoulder edge 31.

It will be understood that the manufacture of panels useful in the invention, in particular in the formation of the cooperating tabs and openings, can also be carried out by other techniques than punching or die-stamping, e.g. by laser-cutting. Of course, the final precision of the assembly will depend on the manufacturing tolerances of such other technique.

With the present disclosure in mind, various modifications will be within the skill of one skilled in the art without departing from the scope of the invention.

We claim:

1. A panel assembly comprising a generally planar first panel having at least one insertion notch in at least one edge thereof, and a generally planar second panel which is arranged in substantially perpendicular relation to said first panel, said second panel having projecting outwardly from at least one edge thereof at least one projecting tab which terminates in a free end and fits into an insertion notch, said tab including at least one shoulder located at a point along the projecting length of said tab which is between said free end and said one edge of said second panel, said shoulder defining a generally straight shoulder edge directed generally perpendicular to the tab length which is in abutting contact with a portion of said first panel adjacent said insertion notch, whereby said one edge of the second panel is maintained by said shoulder edge out of contact with said first panel, said first panel having one face adjacent said shoulder edge and an opposite face remote therefrom and the free tab end lies substantially flush with said opposite face.

2. An assembly according to claim 1, wherein the shape of said projecting tab substantially corresponds with the shape of said insertion notch.

3. An assembly according to claim 1, wherein said projecting tab has a shoulder defining a shoulder edge on each of two opposite sides thereof and both of said shoulder edges are in abutting contact with said first panel.

4. An assembly according to claim 1, wherein said second panel has at least two projecting tabs projecting from the same edge or different edges of said second panel, which at least two tabs lie substantially in the same plane and wherein said first panel has corresponding insertion notches therein.

5. An assembly according to claim 1, wherein said tab is located in the plane of said first panel.

6. An assembly according to claim 1, wherein said panels are made from sheet metal which has been punched to obtain the correct tab and slot configurations.

7. An assembly according to claim 1, wherein said panels are fixed to each other.

8. An assembly according to claim 1, wherein each said notch in said edge of said first panel is elongated inwardly of the panel edge and each corresponding tab on said second panel lies in the same plane as said second panel and fits within one of said notches along a line generally parallel to and spaced inwardly from said panel edge.

\* \* \* \* \*